United States Patent
Cirne

(10) Patent No.: US 7,310,777 B2
(45) Date of Patent: Dec. 18, 2007

(54) USER INTERFACE FOR VIEWING PERFORMANCE INFORMATION ABOUT TRANSACTIONS

(75) Inventor: Lewis K. Cirne, Redwood City, CA (US)

(73) Assignee: Computer Associates Think, Inc., Islandia, NY (US)

(*) Notice: Subject to any disclaimer, the term of this patent is extended or adjusted under 35 U.S.C. 154(b) by 658 days.

(21) Appl. No.: 10/318,327

(22) Filed: Dec. 12, 2002

(65) Prior Publication Data

US 2004/0075690 A1  Apr. 22, 2004

Related U.S. Application Data

(60) Provisional application No. 60/419,689, filed on Oct. 18, 2002.

(51) Int. Cl.
  G06F 3/00   (2006.01)
  G06F 9/00   (2006.01)
  G06F 17/00  (2006.01)

(52) U.S. Cl. .............. 715/763; 715/762; 715/764; 715/839; 717/128; 345/440.1; 345/441

(58) Field of Classification Search ............... 715/839, 715/762, 763, 764; 717/128; 345/440.1, 345/441
  See application file for complete search history.

(56) References Cited

U.S. PATENT DOCUMENTS 4,774,681 A   9/1988  Frisch
5,375,199 A * 12/1994 Harrow et al. ............... 715/771
5,426,730 A *  6/1995 Miyake et al. ............... 715/839
5,655,081 A    8/1997 Bonnell et al.
5,862,381 A    1/1999 Advanti et al.
5,898,873 A    4/1999 Lehr
5,978,594 A   11/1999 Bonnell et al.
5,996,092 A * 11/1999 Augsburg et al. ............. 714/38
6,141,699 A * 10/2000 Luzzi et al. .................. 719/331
6,263,298 B1 *  7/2001 Kerman et al. ............. 702/186
6,266,805 B1   7/2001 Nwana et al.
6,282,701 B1 *  8/2001 Wygodny et al. ........... 717/125
6,332,212 B1  12/2001 Organ et al.
6,611,276 B1   8/2003 Muratori et al.
2002/0198985 A1* 12/2002 Fraenkel et al. ............ 709/224
2003/0065986 A1*  4/2003 Fraenkel et al. ............. 714/47
2004/0068560 A1*  4/2004 Oulu et al. ................. 709/224
2004/0215762 A1* 10/2004 Oulu et al. ................. 709/223
2004/0215768 A1* 10/2004 Oulu et al. ................. 709/224

FOREIGN PATENT DOCUMENTS

EP   1024430 A2 *  8/2000

* cited by examiner

Primary Examiner—John Cabeca
Assistant Examiner—Anita Datta Chaudhuri
(74) Attorney, Agent, or Firm—Vierra Magen Marcus & DeNiro LLP

(57) ABSTRACT

Data about a transaction is accessed. The transaction has a set of components. A graphical representation of the components of the transaction is displayed such that the graphical representation includes a time axis and a call stack position axis. In one embodiment, the time axis depicts time left to right and the call stack position axis depicts call stack position top to bottom. Additionally, the user interface can receive a selection of one of the components, access data for the selected component and display additional details about that selected component.

38 Claims, 7 Drawing Sheets

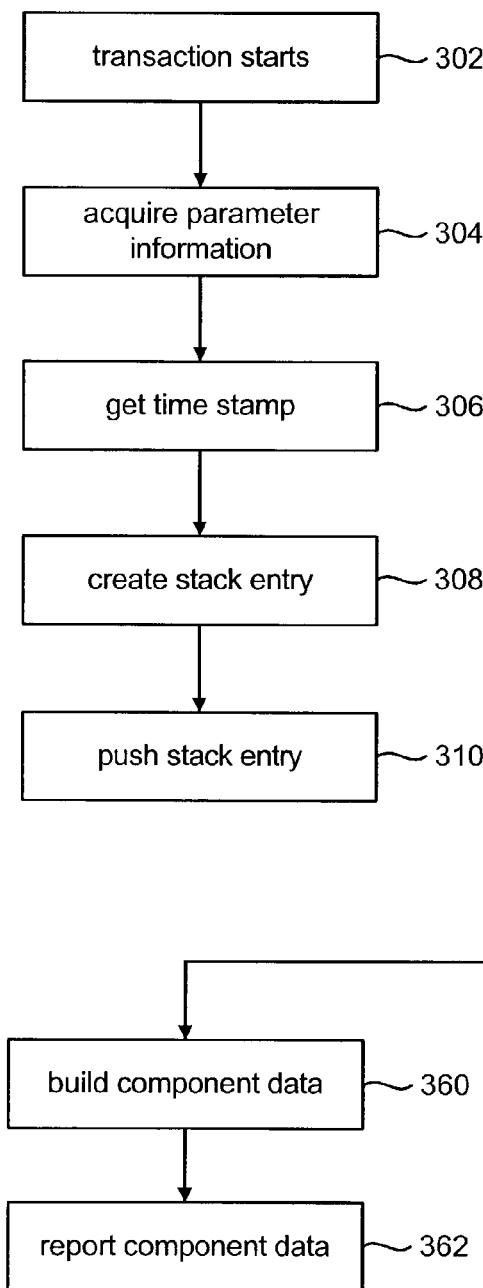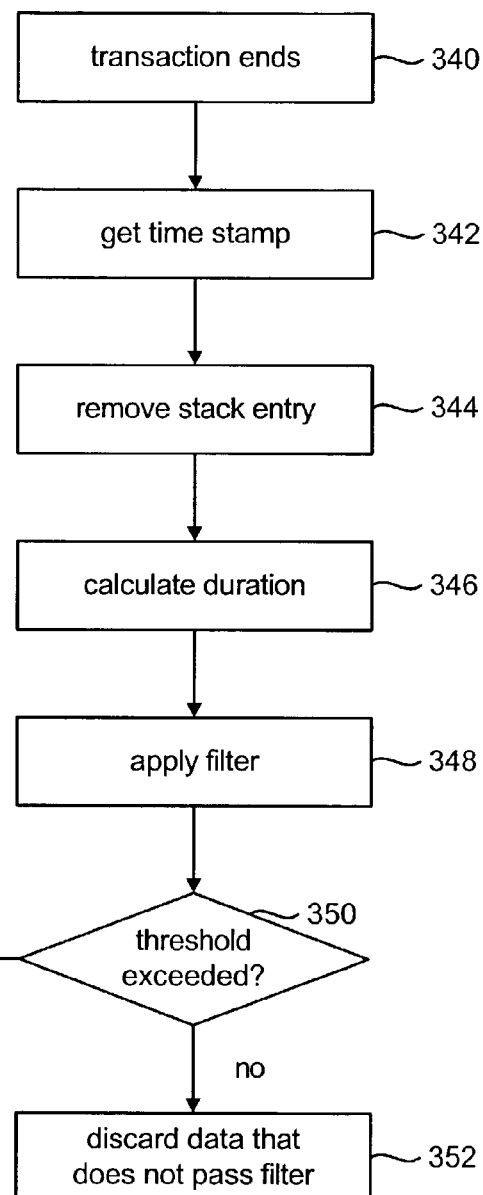

USER INTERFACE FOR VIEWING PERFORMANCE INFORMATION ABOUT TRANSACTIONS

This application claims the benefit of U.S. Provisional Application No. 60/419,689, "Web Application Monitoring," filed on Oct. 18, 2002, which is incorporated herein by reference in its entirety.

CROSS-REFERENCE TO RELATED APPLICATION

This Application is related to U.S. Patent Application titled "Transaction Tracer," by Lewis K. Cirne and Daryl L. Puryear, U.S. patent application Ser. No. 10/381,272, filed on the Dec. 12, 2002, which is incorporated by reference in its entirety.

BACKGROUND OF THE INVENTION

1. Field of the Invention

The present invention is directed to technology for a user interface that is used to view information about transactions in a computing environment.

2. Description of the Related Art

As the Internet's popularity grows, more businesses are establishing a presence on the Internet. These businesses typically set up web sites that run one or more web applications. One disadvantage of doing business on the Internet is that if the web site goes down, makes an error, becomes unresponsive or otherwise is not properly serving customers, the business is losing potential sales and/or customers. Similar issues exist with Intranets and Extranets. Thus, there is a need to monitor live web applications and web sites to make sure that they are running properly.

One particular scenario that web application developers seek to avoid is a task that stalls, makes an error or otherwise has a bug. To debug software with a bug or task that stalls, the developer or administrator usually attempts to figure out which code is causing the bug or stall so that code can be fixed to avoid future issues. While it is usually easy to detect when an application is stalling or not working because the performance of the application becomes noticeably slower, the application stops functioning or the application produces undesired results, it is often very difficult to determine which portion of the software is responsible for the stall. And, even if a developer can determine in which method, function, routine, process, etc. that the application was being performed when the problem occurred, it is not clear whether the problem was because of that method, function, routine, process, etc. or another method, function, routine, process, etc called by that method, function, routine, process, etc.

Thus, there is a need to improve the ability to determine which portion of the software is responsible for problems in an application.

SUMMARY OF THE INVENTION

The present invention, roughly described, pertains to technology for a user interface that is used to view information about transactions. For example, the present invention can be used to determine which component of a transaction running in a software application is causing a performance problem.

The user interface accesses data about a transaction. The transaction has a set of traced component invocations. A graphical representation of the components of the transaction is displayed. In one embodiment, the graphical representation includes a time axis and a call stack position axis. The time axis depicts time left to right and the call stack position axis depicts call stack position top to bottom. In some embodiments, the user interface can receive a selection of one of the components, access data for the selected component and display additional details about that selected component.

One embodiment of the user interface is used with a transaction tracer. Other embodiments are used with data providing mechanisms other than a transaction tracer. One example of a transaction tracer allows a user to specify a threshold trace period and initiate transaction tracing on one, some, or all transactions running on a software system. Transactions with an execution time that exceeds the threshold trace period are reported to the user using the graphical user interface. The graphical user interface lists transactions exceeding the specified threshold and provides the ability to display a visualization for each reported transaction that enables the user to immediately understand where time was spent in the traced transaction.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 4 is a flow chart describing one embodiment of a process for starting the tracing of a transaction.

FIG. 5 is a flow chart describing one embodiment of a process for concluding the tracing of a transaction.

DETAILED DESCRIPTION

The present invention is directed to tracing transactions to identify which components of a transaction may be executing too slow. In one embodiment, the system traces transactions in order to identify those transactions that have an execution time greater than a threshold time. A transaction is a method, process, procedure, function, thread, set of instructions, etc. for performing a task. In one embodiment, the present invention is used to monitor methods in a Java environment. In that embodiment, a transaction is a method invocation in a running software system that enters the Java Virtual Machine ("JVM") and exits the JVM (and all that it calls). In one embodiment, the system described below can initiate transaction tracing on one, some, or all transactions managed by the system. A user, or another entity, can specify a threshold trace period. All transactions whose root level execution time exceeds the threshold trace period are reported. In one embodiment, the reporting will be performed by a Graphical User Interface ("GUI") that lists all transactions exceeding the specified threshold. For each listed transaction, a visualization can be provided that enables the user to immediately understand where time was being spent in the traced transaction. Although the implementation described below is based on a Java application, the present invention can be used with other programming languages, paradigms and/or environments.

Figure 1:
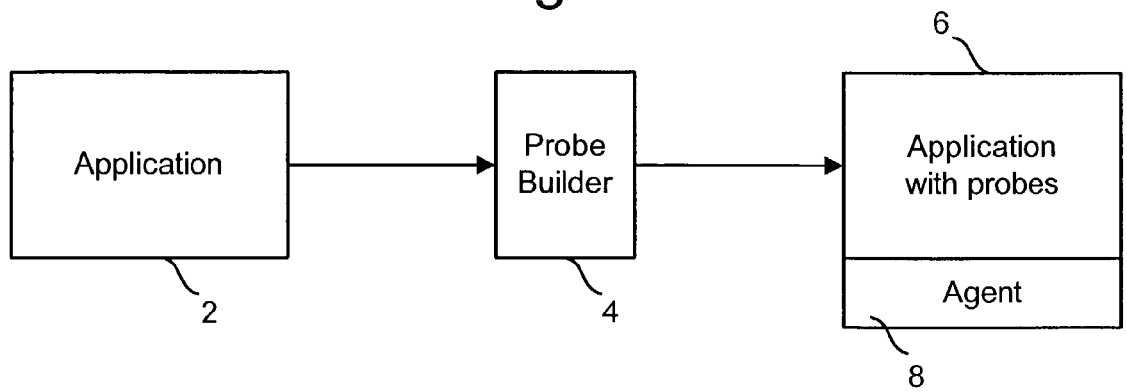
FIG. 1 is a block diagram describing how bytecode for an application is instrumented.

There are many ways to implement the present invention. One example is to implement the present invention within an application performance management tool. One embodiment of such an application performance management tool monitors performance of an application by having access to the source code and modifying that source code. Sometimes, however, the source code is not available. Another type of tool performs application performance management without requiring access to or modification of the application's source code. Rather, the tool instruments the application's object code (also called bytecode). FIG. 1 depicts an exemplar process for modifying an application's bytecode. FIG. 1 shows Application 2, Probe Builder 4, Application 6 and Agent 8. Application 6 includes probes, which will be discussed in more detail below. Application 2 is the Java application before the probes are added. In embodiments that use programming language other than Java, Application 2 can be a different type of application.

Probe Builder 4 instruments (e.g. modifies) the bytecode for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the Java application is referred to as a managed application. More information about instrumenting byte code can be found in U.S. Pat. No. 6,260,187 "System For Modifying Object Oriented Code" by Lewis K. Cirne, incorporated herein by reference in its entirety.

One embodiment of the present invention instruments bytecode by adding new code that activates a tracing mechanism when a method starts and terminates the tracing mechanism when the method completes. To better explain this concept consider the following example pseudo code for a method called "exampleMethod." This method receives an integer parameter, adds 1 to the integer parameter, and returns the sum:

```
public int
    exampleMethod(int x)
    {
        return x + 1;
    }
```

One embodiment of the present invention will instrument this code, conceptually, by including a call to a tracer method, grouping the original instructions from the method in a "try" block and adding a "finally" block with a code that stops the tracer:

```
public int
    exampleMethod(int x)
    {
        IMethodTracer tracer = AMethodTracer.loadTracer(
            "com.introscope.agenttrace.MethodTimer",
            this,
            "com.wily.example.ExampleApp",
            "exampleMethod",
            "name=Example Stat");
        try  {
            return x + 1;
        } finally        {
                    tracer.finishTrace( );
                }
    }
```

IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop the tracer and perform error handling. The method finishTrace calls doFinishTrace to actually stop the tracer. Within AMethodTracer, startTrace and finishTracer are final and void methods; and doStartTrace and doFinishTrace are protected, abstract and void methods. Thus, the methods doStartTrace and do FinishTrace must be implemented in subclasses of AMethodTracer. Each of the subclasses of AMethodTracer implement the actual tracers. The method loadTracer is a static method that calls startTrace and includes five parameters. The first parameter, "com. introscope . . . " is the name of the class that is intended to be instantiated that implements the tracer (e.g. discussed below—see FIGS. 4 and 5). The second parameter, "this" is the object being traced. The third parameter "com.wily.example . . . " is the name of the class that the current instruction is inside of. The fourth parameter, "exampleMethod" is the name of the method the current instruction is inside of. The fifth parameter, "name= . . . " is the name to record the statistics under. The original instruction (return x+1) is placed inside a "try" block. The code for stopping the tracer (a call to the static method tracer.finishTrace) is put within the finally block.

The above example shows source code being instrumented. In one embodiment, the present invention doesn't actually modify source code. Rather, the present invention modifies object code. The source code examples above are used for illustration to explain the concept of the present invention. The object code is modified conceptually in the same manner that source code modifications are explained above. That is, the object code is modified to add the functionality of the "try" block and "finally" block. More information about such object code modification can be found in U.S. patent application Ser. No. 09/795,901, "Adding Functionality To Existing Code At Exits," filed on Feb. 28, 2001, incorporated herein by reference in its entirety. In another embodiment, the source code can be modified as explained above.

Figure 2:
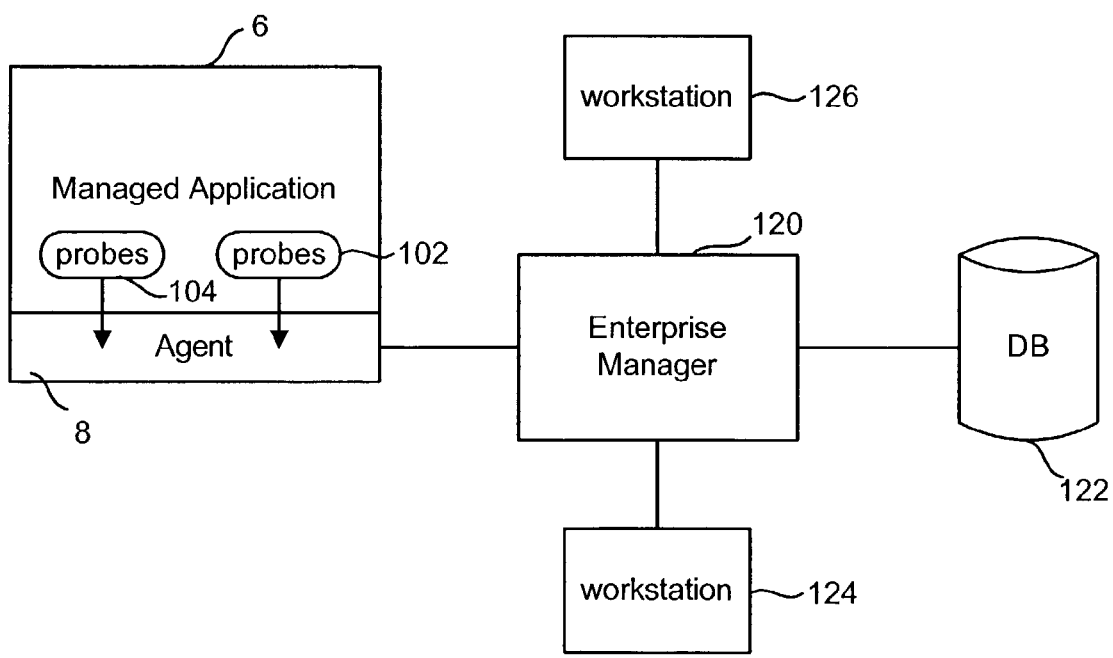
FIG. 2 is a block diagram of a system for monitoring an application. This system represents one example of a system that can implement the present invention.

FIG. 2 is a conceptual view of the components of the application performance management tool. In addition to managed Application 6 with probes 102 and 104, FIG. 2 also depicts Enterprise Manager 120, database 122, workstation 124 and workstation 126. As a managed application runs, probes (e.g. 102 and/or 104) relay data to Agent 8. Agent 8 then collects and summarizes the data, and sends it to Enterprise Manager 120. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2, each of the components are running on different machines. That is, workstation 126 is on a first computing device, workstation 124 is on a second computing device, Enterprise Manager 120 is on a third computing device, and managed Application 6 is running on a fourth computing device. In another embodiment, two or more (or all) of the components are operating on the same computing device. For example, managed application 6 and Agent 8 may be on a first computing device, Enterprise Manager 120 on a second computing device and a workstation on a third computing device. Alternatively, all of the components of Figure two can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

In one embodiment, a user of the system in FIG. 2 can initiate transaction tracing on all or some of the Agents managed by an Enterprise Manager by specifying a threshold trace period. All transactions inside an Agent whose execution time exceeds this threshold level will be traced and reported to the Enterprise Manager 120, which will route the information to the appropriate workstations who have registered interest in the trace information. The workstations will present a GUI that lists all transactions exceeding the threshold. For each listed transaction, a visualization that enables a user to immediately understand where time was being spent in the traced transaction can be provided.

Figure 3:
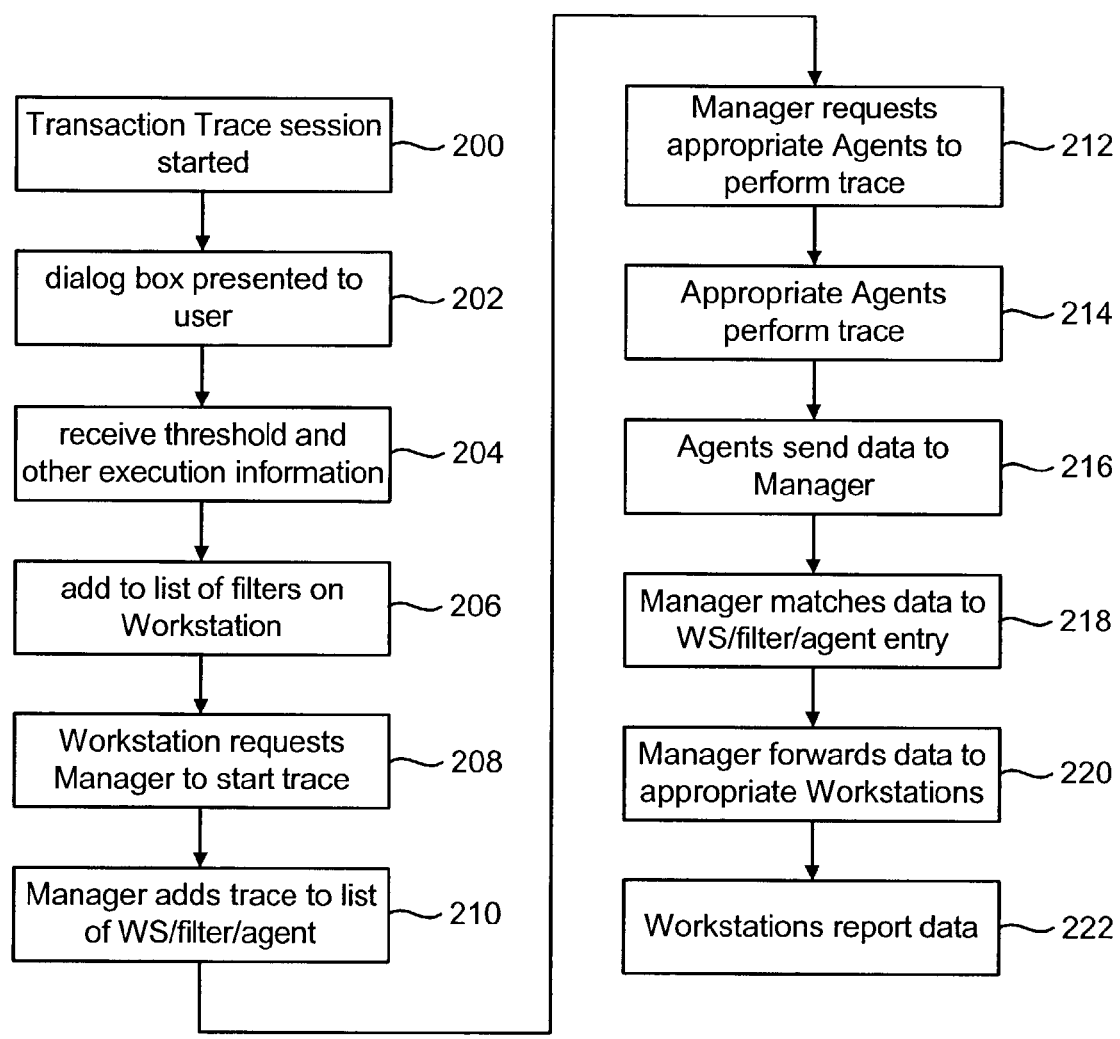
FIG. 3 is a flow chart describing one embodiment of a process for tracing transactions using the system of FIG. 2.

FIG. 3 is a flowchart describing one embodiment of a process for tracing transactions using the system of FIG. 2. In step 200, a transaction trace session is started. In one embodiment of step 200, a window is opened and a user will select a dropdown menu to start a transaction trace session. In other embodiments, other methods can be used to start the session. In step 202, a dialog box is presented to the user. This dialog box will ask the user for various configuration information. In step 204, the various configuration information is provided by the user by typing information into the dialogue box. Other means for entering the information can also be used within the spirit of the present invention. One variable entered by the user in step 204 is the threshold trace period. That is, user enters a time, which could be in seconds, milliseconds, microseconds, etc. The system will only report those transactions that have an execution time longer than the threshold period provided. For example, if the threshold is one second, the system will only report transactions that are executing for longer than one second. In some embodiments, step 204 only includes providing a threshold time period. In other embodiments, other configuration data can also be provided. For example, the user can identify an Agent, a set of Agents, or all Agents. In that embodiment, only identified Agents will perform the transaction tracing described herein. In another embodiment, Enterprise Manager 120 will determine which Agents to use. Another configuration variable that can be provided is the session length. The session length indicates how long the system will perform the tracing. For example, if the session length is ten minutes, the system will only trace transactions for ten minutes. At the end of the ten minute period, new transactions that are started will not be traced; however, transactions that have already started during the ten minute period will continue to be traced. In other embodiments, at the end of the session length all tracing will cease regardless of when the transaction started. Other configuration data can also include specifying one or more userIDs, a flag set by an external process or other data of interest to the user. For example, the userID is used to specify that the only transactions initiated by processes associated with a particular one, or more userIDs will be traced. The flag is used so that an external process can set a flag for certain transactions, and only those transactions that have the flag set will be traced. Other parameters can also be used to identify which transactions to trace. The information provided in step 202 is used to create a filter.

In step 206 of FIG. 3, the workstation adds the new filter to a list of filters on the workstation. In step 208, the workstation requests Enterprise Manager 120 to start the trace using the new filter. In step 210, Enterprise Manager 120 adds the filter received from the workstation to a list of filters. For each filter in its list, Enterprise Manager 120 stores an identification of the workstation that requested the filter, the details of the filter (described above), and the Agents the filter applies to. In one embodiment, if the workstation does not specify which Agents the filter applies to, then the filter will apply to all Agents. In step 212, Enterprise Manager 120 requests the appropriate Agents to perform the trace. In step 214, the appropriate Agents perform the trace. In step 216, the Agents performing the trace send data to Enterprise Manager 120. More information about steps 214 and 216 will be provided below. In step 218, Enterprise Manager 120 matches the received data to the appropriate workstation/filter/Agent entry. In step 220, Enterprise Manager 120 forwards the data to the appropriate workstation(s) based on the matching in step 218. In step 222, the appropriate workstations report the data. In one embodiment, the workstation can report the data by writing information to a text file, to a relational database, or other data container. In another embodiment, a workstation can report the data by displaying the data in a GUI. More information about how data is reported is provided below.

As noted above, the Agents perform the tracing of the transactions. To perform such tracing, the Agents leverage what is called Blame technology. Blame Technology works in a managed Java Application to enable the identification of component interactions and component resource usage. Blame Technology tracks components that are specified to it. Blame Technology uses the concepts of consumers and resources. Consumers request some activity; resources perform the activity. A component can be both a consumer and a resource, depending on the context.

When reporting about transactions, the word Called designates a resource. This resource is a resource (or a sub-resource) of the parent component, which is the consumer. For example, under the consumer Servlet A (see below), there may be a sub-resource Called EJB. Consumers and resources can be reported in a tree-like manner. Data for a transaction can also be stored according to the tree. For example, if a Servlet (e.g. Servlet A) is a consumer of a network socket (e.g. Socket C) and is also a consumer of an EJB (e.g. EJB B), which is a consumer of a JDBC (e.g. JDBC D), the tree might look something like the following:

---

Servlet A
  Data for Servlet A
  Called EJB B
    Data for EJB B
    Called JDBC D
      Data for JDBC D
  Called Socket C
    Data for Socket C

---

In one embodiment, the above tree is stored by the Agent in a stack. This stack is called the Blame Stack. When transactions are started, they are pushed onto the stack. When transactions are completed, they are popped off the stack. In one embodiment, each transaction on the stack has the following information stored: type of transaction, a name used by the system for that transaction, a hash map of parameters, a timestamp for when the transaction was pushed onto the stack, and sub-elements. Sub-elements are Blame Stack entries for other components (e.g. methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. As the tree above notes, EJB B is a sub-element of Servlet A and also has its own entry. The top (or initial) entry (e.g., Servlet A) for a transaction, is called the root component. Each of the entries on the stack is an object. While the embodiment described herein includes the use of Blame technology and a stack, other embodiments of the present invention can use different types of stack, different types of data structures, or other means for storing information about transactions.

FIG. 4 is a flowchart describing one embodiment of a process for starting the tracing of a transaction. The steps of FIG. 4 are performed by the appropriate Agent(s). In step 302, a transaction starts. In one embodiment, the process is triggered by the start of a method as described above (e.g. the calling of the "loadTracer" method). In step 304, the Agent acquires the desired parameter information. In one embodiment, a user can configure which parameter information is to be acquired via a configuration file or the GUI. The acquired parameters are stored in a hash map, which is part of the object pushed onto the Blame Stack. In other embodiments, the identification of parameters are pre-configured. There are many different parameters that can be stored. In one embodiment, the actual list of parameters used is dependent on the application being monitored. The present invention is not limited to any particular set of parameters. Table 1 provides examples of some parameters that can be used with the present invention. Other parameters can also be used.

TABLE 1

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

In step 306, the system acquires a timestamp indicating the current time. In step 308, a stack entry is created. In step 310, the stack entry is pushed onto the Blame Stack. In one embodiment, the timestamp is added as part of step 310. The process of FIG. 4 is performed when a transaction is started. A process similar to that of FIG. 4 is performed when a sub-component of the transaction starts (e.g. EJB B is a sub-component of Servlet A—see tree described above).

FIG. 5 is a flowchart describing one embodiment of a process for concluding the tracing of a transaction. The process of FIG. 5 is performed by an Agent when a transaction ends. In step 340, the process is triggered by a transaction (e.g. method) ending as described above (e.g. calling of the method "finishTrace"). In step 342, the system acquires the current time. In step 344, the stack entry is removed. In step 346, the execution time of the transaction is calculated by comparing the timestamp from step 342 to the timestamp stored in the stack entry. In step 348, the filter for the trace is applied. For example, the filter may include a threshold period of one second. Thus, step 348, would include determining whether the calculated duration from step 346 is greater than one second. If the threshold is not exceeded (step 350), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the Agent to other components in the system of FIG. 2. If the duration exceeds the threshold (step 350), then the Agent builds component data in step 360. Component data is the data about transaction that will be reported. In one embodiment, the component data includes the name of the transaction, the type of the transaction, the start time of the transaction, the duration of the transaction, a hash map of the parameters, and all of the sub-elements (which can be a recursive list of elements). Other information can also be part of the component data. In step 362, the Agent reports the component data by sending the component data via the TCP/IP protocol to Enterprise Manager 120.

FIG. 5 represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

Figure 6:
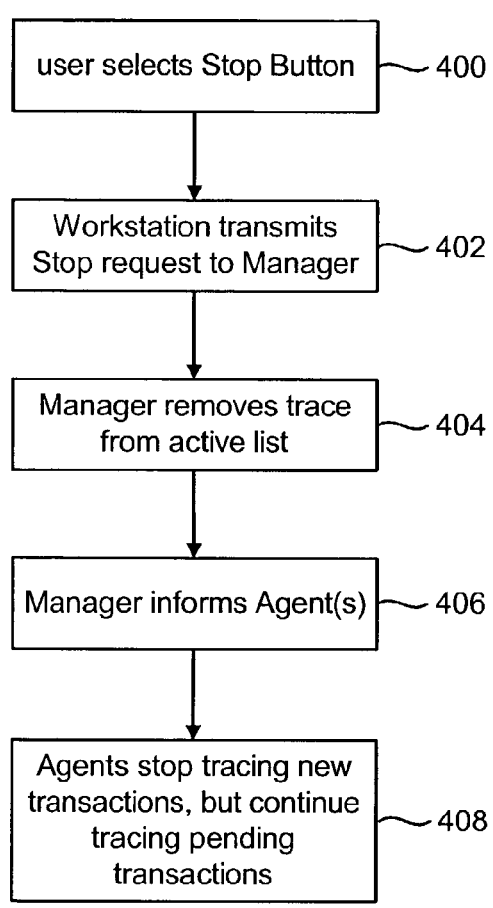
FIG. 6 is a flow chart describing one embodiment of a process for stopping the tracing of a transaction.

While the tracing is being performed, a user can stop the tracing and restart the tracing in real time by selecting buttons in the GUI. For example, FIG. 6 provides a flowchart describing one embodiment of a process for stopping the tracing of a transaction. In step 400, user selects the stop button on the GUI. In step 402, the workstation transmits the stop request to Enterprise Manager 120. Enterprise Manager 120 removes the trace from the active list of filters in step 404. In one embodiment, the trace information is not discarded, but stored in a separate file or list. Enterprise Manager 120 informs the appropriate Agents that the trace has been stopped in step 406. In step 408, the appropriate Agent stops tracing any new transactions that are started, but will continue to trace pending transactions. In other embodiments, all tracing ceases for that particular filter.

Figure 7:
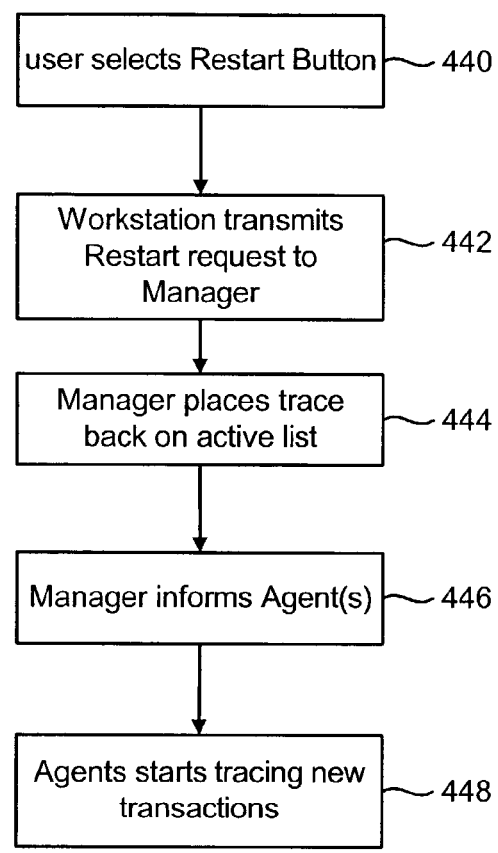
FIG. 7 is a flow chart describing one embodiment of a process for restarting the tracing of a transaction.

FIG. 7 is a flowchart describing one embodiment for a process for restarting a trace that was stopped. In step 440, the user selects the restart button in the GUI. In step 442, the workstation transmits a restart request to Enterprise Manager 120. Enterprise Manager 120 will place the filter back on the active list in step 444. In step 446, the Enterprise Manager 120 informs the appropriate Agents that the trace has been restarted. In step 448, the Agents will start tracing transactions that are newly started after the restart request. In addition, when performing step 448, the session length will be reset to its original value as specified in step 204.

In one embodiment, the Agents have anti-flooding logic that places a default limit on the number of transactions traced for time interval. For example, there may be a default limit of 200 transactions traced in a 15 second period. After this limit has been exceeded, the Agent will log that the anti-flood threshold was exceeded and will stop reporting transaction data until the 15 second period has expired, at which point transaction tracing resumes. Although the example uses a limit of 200 transactions traced in a 15-second period, other limits can also be used. The anti-flooding level can be adjusted by changing information in a configuration file, on a GUI, in a profile, etc.

Figure 8:
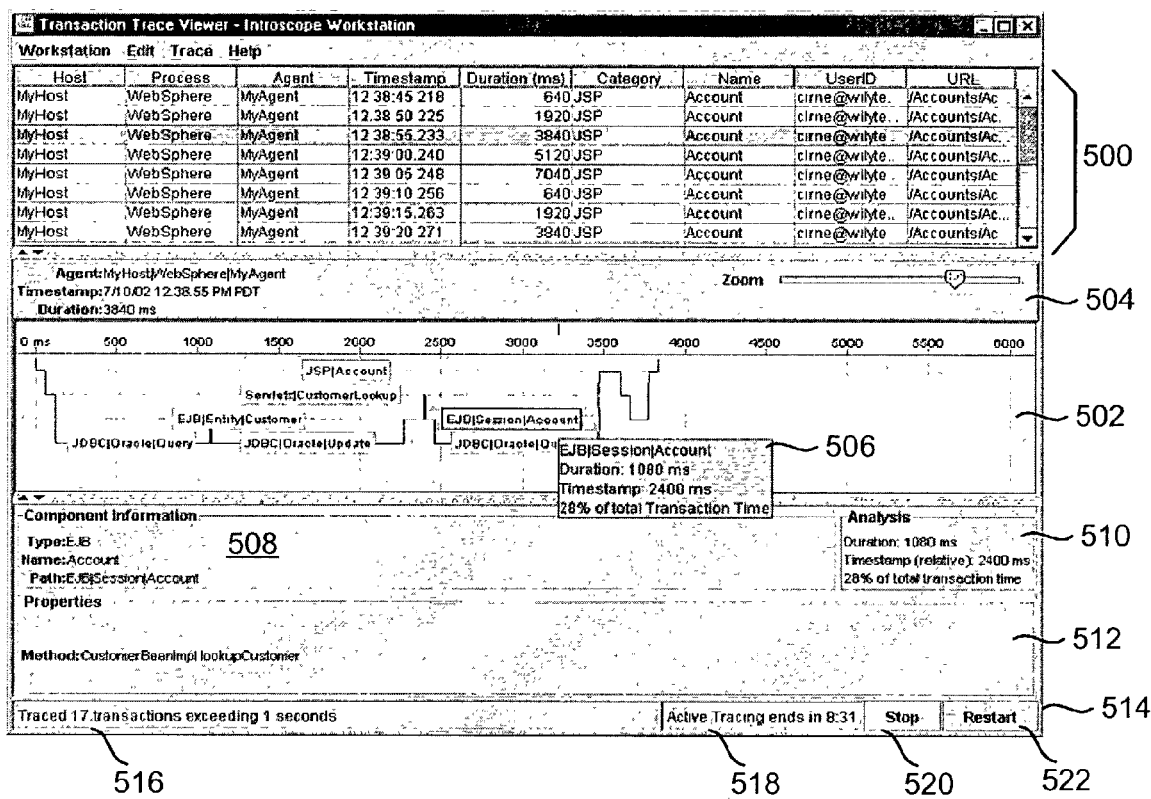
FIG. 8 depicts a graphical user interface.

FIG. 8 provides one example of a graphical user interface to be used for reporting transactions with the present invention. The GUI includes a transaction trace table 500 which lists all of the transactions that have satisfied the filter (e.g. execution time greater than the threshold). Because the number of rows on the table may be bigger than the allotted space, the transaction trace table 500 can scroll. Table 2, below, provides a description of each of the columns of transaction trace table 500.

TABLE 2

| Column Header | Value |
| --- | --- |
| Host | Host that the traced Agent is running on |
| Process | Agent Process name |
| Agent | Agent ID |
| TimeStamp (HH:MM:SS.DDD) | TimeStamp (in Agent's JVM's clock) of the initiation of the Trace Instance's root entry point |
| Category | Type of component being invoked at the root level of the Trace Instance. This maps to the first segment of the component's relative blame stack: Examples include Servlets, JSP, EJB, JNDI, JDBC, etc. |
| Name | Name of the component being invoked. This maps to the last segment of the blamed component's metric path. (e.g. for "Servlets\|MyServlet", Category would be Servlets, and Name would be MyServlet). |
| URL | If the root level component is a Servlet or JSP, the URL passed to the Servlet/JSP to invoke this Trace Instance. If the application server provides services to see the externally visible URL (which may differ from the converted URL passed to the Servlet/JSP) then the externally visible URL will be used in preference to the "standard" URL that would be seen in any J2EE Servlet or JSP. If the root level component is not a Servlet or JSP, no value is provided. |
| Duration (ms) | Execution time of the root level component in the Transaction Trace data |
| UserID | If the root level component is a Servlet or JSP, and the Agent can successfully detect UserID's in the managed application, the UserID associated with the JSP or Servlet's invocation. If there is no UserID, or the UserID cannot be detected, or the root level component is not a Servlet or JSP, then there will be no value placed in this column. |

Each transaction that has an execution time greater than the threshold time period will appear in the transaction trace table 500. The user can select any of the transactions in the transaction trace table by clicking with the mouse or using a different means for selecting a row. When a transaction is selected, detailed information about that transaction will be displayed in transaction snapshot 502 and snapshot header 504.

Transaction snapshot 502 provides information about which transactions are called and for how long. Transaction snapshot 502 includes views (see the rectangles) for various transactions, which will be discussed below. If the user positions a mouse (or other pointer) over any of the views, mouse-over info box 506 is provided. Mouse-over info box 506 indicates the following information for a component: name/type, duration, timestamp and percentage of the transaction time that the component was executing. More information about transaction snapshot 502 will be explained below. Transaction snapshot header 504 includes identification of the Agent providing the selected transaction, the timestamp of when that transaction was initiated, and the duration. Transaction snapshot header 504 also includes a slider to zoom in or zoom out the level of detail of the timing information in transaction snapshot 502. The zooming can be done in real time.

In addition to the transaction snapshot, the GUI will also provide additional information about any of the transactions within the transaction snapshot 502. If the user selects any of the transactions (e.g., by clicking on a view), detailed information about that transaction is provided in regions 508, 510, and 512 of the GUI. Region 508 provides component information, including the type of component, the name the system has given to that component and a path to that component. Region 510 provides analysis of that component, including the duration the component was executing, a timestamp for when that component started relative to the start of the entire transaction, and an indication the percentage of the transaction time that the component was executing. Region 512 includes indication of any properties. These properties are one or more of the parameters that are stored in the Blame Stack, as discussed above.

The GUI also includes a status bar 514. The status bar includes indication 516 of how many transactions are in the transaction trace table, indication 518 of how much time is left for tracing based on the session length, stop button 520 (discussed above), and restart button 522 (discussed above).

Figure 9:
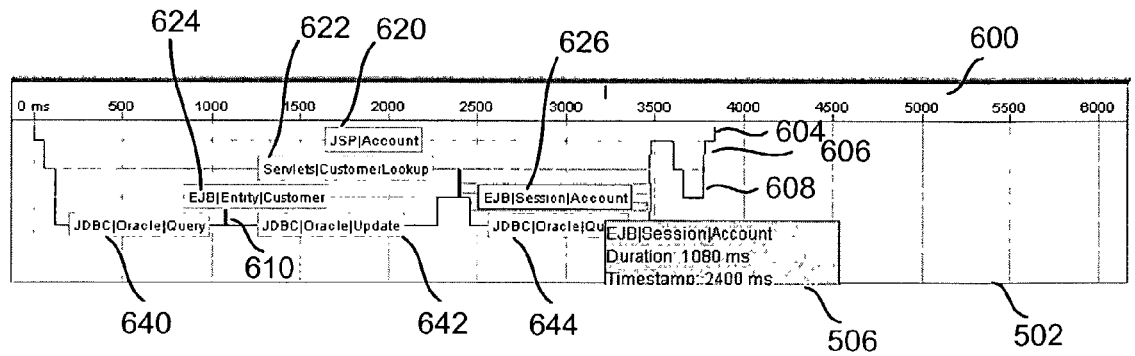
FIG. 9 depicts a portion of the graphical user interface of FIG. 8.

FIG. 9 depicts transaction snapshot 502. Along the top of snapshot 502 is time axis 600. In one embodiment, time axis is in milliseconds. The granularity of the time access is determined by the zoom slider in snapshot header 504. Below the time axis is a graphical display of the various components of a transaction. The visualization includes a set of rows 604, 606, 608, and 610 along an axis indicating the call stack position. Each row corresponds to a level of subcomponents. The top row pertains to the root component 620. Within each row is one or more boxes which identify the components. In one embodiment, the identification includes indication of the category (which is the type of component—JSP, EJB, servlets, JDBC, etc.) and a name given to the component by the system. The root level component is identified by box 620 as JSP|Account. In the transaction snapshot, this root level component starts at time zero. The start time for the root level component is the start time for the transaction and the transaction ends when the root level component JSP|Account 620 completes. In the present case, the root level component completes in approximately 3800 milliseconds. Each of the levels below the root level 620 are components called by the previous level. For example, the method identified by JSP/Account may call a servlet called CustomerLookup. Servlet|CustomerLookup is called just after the start of JSP|Account 620 and Servlet|CustomerLookup 622 terminates approximately just less than 3500 milliseconds. Servlets|CustomerLookup 622 calls EJB|Entity|Customer 624 at approximately 200 milliseconds. EJB|entity customer 624 terminates at approximately 2400 milliseconds, at which time Servlet|CustomerLookup 622 calls EJB|Session|Account 626. EJB|session account 626 is started at approximately 2400 milliseconds and terminates at approximately 3400 milliseconds. EJB|EntityCustomer 624 calls JDBC|Oracle|Query 640 at approximately 250 milliseconds. JDBC|Oracle|Query 620 concludes at approximately 1000 milliseconds, at which time EJB|Entity|Customer 624 calls JDBC|Oracle|Update 642 (which itself ends at approximately 2300 milliseconds). EJB/Session/Account 626 calls JDBC|Oracle/Query 644, which terminates at approximately 3400 milliseconds. Thus, snapshot 502 provides a graphical way of displaying which components call which components. Snapshot 502 also shows how long each component was executing for. Thus, if the execution of JSP|Account 620 took too long, the graphical view of snapshot 502 will allow user to see which of the subcomponents is to blame for the long execution of JSP account 620.

The transaction snapshot provides for the visualization of time from left to right and the visualization of the call stack top to bottom. Clicking on any view allows the user to see more details about the selected component. A user can easily see which particular component is causing a transaction to run too slowly. That is, if a transaction is too slow, it is likely that one of the subcomponents is running significantly longer than the other subcomponents. The user can see which subcomponent is running longest and attempt to debug that particular subcomponent.

Figure 10:
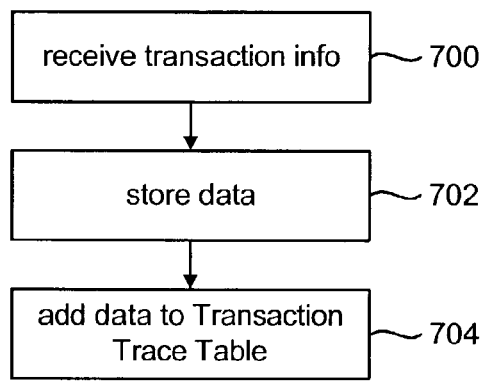
FIG. 10 is a flow chart describing one embodiment of a process for reporting data in the transaction trace table of the graphical user interface depicted in FIG. 8.

FIG. 10 is a flowchart describing one embodiment of a process for reporting data in the transaction trace table 500. The process of FIG. 10 is performed by a workstation. In step 700, the workstation receives transaction information from Enterprise Manager 120. In step 702, the data is stored. In step 704, the data is added to the transaction table as a new row on table 500.

Figure 11:
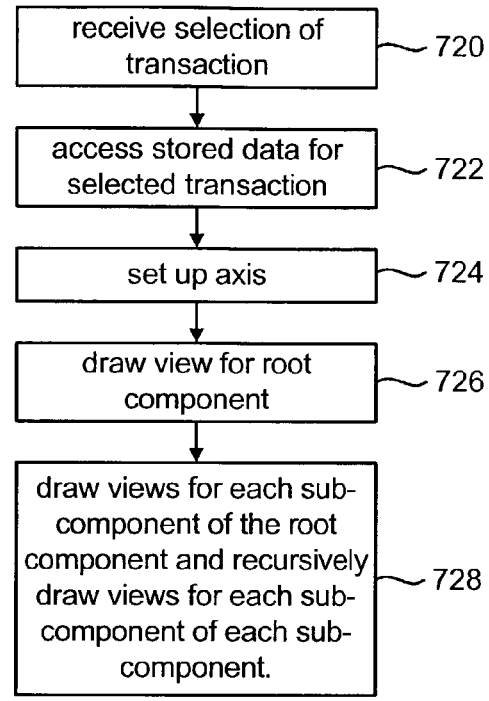
FIG. 11 is a flow chart describing one embodiment of a process for displaying a transaction snap shot.

FIG. 11 is a flowchart describing one embodiment of a process for displaying a transaction snapshot. In step 720, the GUI receives a selection of a transaction. That is, the user selects one of the rows of transaction trace table 500. Each row of transaction trace table 500 represents data for one particular transaction. The user can select a transaction by clicking on the row. In other embodiments, other means can be used for selecting a particular transaction. In step 722, the data stored for that selected transaction is accessed. In step 724, the axis for the transaction snapshot is set up. In one embodiment, the system renders the time axis along the X axis. For example, in the embodiment depicted in FIG. 8, the time axis is from zero ms to 6000 ms. The zoom slider in snapshot header 504 (see FIG. 8) is used to change the time axis. In some embodiments, configuration files can be used to change the time. In one embodiment, the actual lime representing the axis for call stack position is not rendered; however, the axis is used as described herein. In step 726, the view for the root component is drawn. For example, in transaction snapshot 502, the view for "JSP|Account" is drawn. In step 728, views for each of the subcomponents of the root component are drawn. Additionally, the system recursively draws views for each subcomponent of each subcomponent. For example, looking at FIG. 8, the first root component JSP|Account is drawn. Then, the subcomponents of the root component are drawn (e.g., "Servlets|CustomerLookup" is drawn). Then, recursively for each subcomponent, a view is drawn. First, a view is drawn for EJB|Entity|Customer, then the subcomponents of EJB|Entity|Customer are drawn (e.g. JDBC|Oracle|Query and JDBC|Oracle|Update). After the components for EJB|Entity|Customer are drawn, the view for EJB|Session|Account is drawn, followed by the subcomponent JDBC|Oracle|Query.

Figure 12:
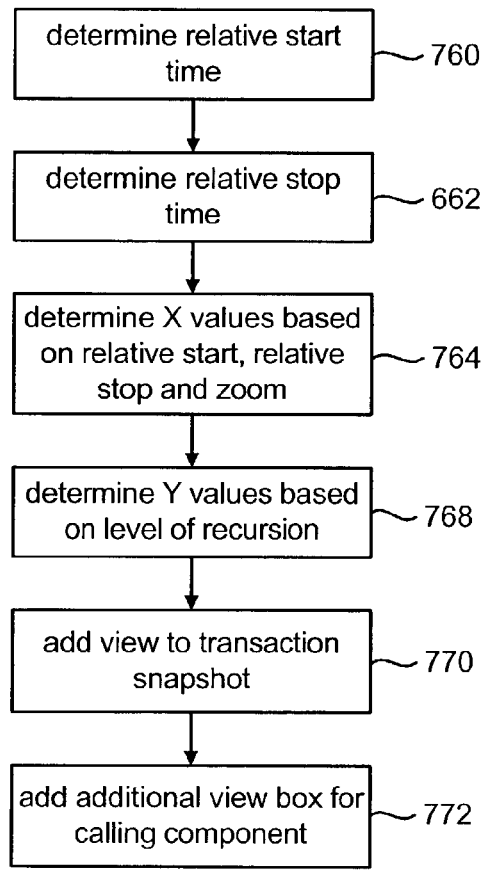
FIG. 12 is a flow chart describing one embodiment of a process for drawing a view for a component.

FIG. 12 is a flowchart describing one embodiment of a process for drawing a view for a particular component. In step 760, the relative start time is determined. In one embodiment, the view is the root component, then the start time is at 0 ms. If the view is not from the root component, then the timestamp of the start of the component is compared to the timestamp of the start of the root component. The difference between the two timestamps is the start time for the component being rendered. In step 662, the relative stop time is determined. By relative, it is meant relative to the root component. Thus, the stop time is determined for the component being rendered. The stop time of the component being rendered is compared to the stop time of the root component. The difference in the actual stop time of the root component as compared to the actual stop time of the component under consideration is subtracted from the stop time of the root component in the transaction snapshot 502. In step 764, the X values (time axis) of the start and end of the rectangle for the view are determined based on the relative start time, relative stop time, and the zoom factor. Based on knowing the relative start time, the relative stop time, and the extent of the zoom slider, the exact coordinate of the beginning of the rectangle and the end of the rectangle can be determined. In step 768, the Y values (call stack position axis) of the top and bottom of the rectangle are determined based on the level of the subcomponent. That is, the Y values of all of the rectangles are predetermined based on whether it is the root component, the first subcomponent, second subcomponent, third subcomponent, etc. In step 770, the view is added to the transaction snapshot. In step 772, an additional view box for the calling component is also added. The calling component is a component that invokes the component being drawn. For example, in the transaction snapshot of 502, the calling component of Servlets|CustomerLookup is JSP|Account. More details of step 772 will be explained below with respect to FIGS. 13-A-E.

FIGS. 13-A-E depict a portion of transaction snapshot 502 during the process of creating the displayed snapshot. FIG. 13A shows transaction snapshot after view 800 for the root component is added to the transaction snapshot. The view includes a rectangle indicating the time duration and a label (e.g. "JSP|Account"). When the system is adding the root component, step 772 is not performed because there is not a calling component within the same transaction. FIG. 13B shows the transaction snapshot after the first subcomponent is added. The transaction snapshot now includes box 802, which includes a view box for the first subcomponent and the additional view box for the calling component. Note that the height of box 800 appears to be half the size of the height of box 802. That is because half of box 802 is part of the view for JSP|Account, the root component, and is added as part of step 772 during the process when the view for the first subcomponent is added. When the user moves the mouse over the view for JSP|Account, a mouse-over event will be created for that view. When there is a mouse-over event, two results occur. First, mouse-over info box 506(c) (FIG. 8) is depicted. Additionally, the view is highlighted. FIG. 13-C shows how the view for JSP|Account will be highlighted. The highlighting portion is marked by reference number 804 to show the view for JSP|Account. As can be seen, the view includes the original longer length box 800, plus a portion of box 802. Thus, when the view for JSP|Account was first created, only a portion of the view was displayed. Additional portions of the view are added to the original portion to indicate when that particular component is calling another subcomponent.

FIG. 13-D shows the transaction snapshot after a subcomponent of "Servlets/CustomerLookup" is added. Box 810 has been added. Box 810 includes a portion of the view for EJB|Entity|Customer and a portion of the view for Servlets|CustomerLookup. Thus, when there is a mouse-over event for Servlets|CustomerLookup, then the view 812 for Servlets|CustomerLookup is highlighted, as can be seen in FIG. 13-E.

Figure 14:
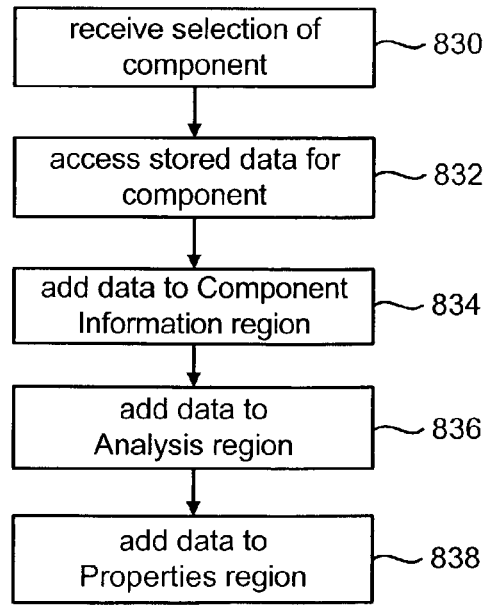
FIG. 14 is a flow chart describing one embodiment of a process for reporting detailed information about a component of a transaction.
Figure 13A:
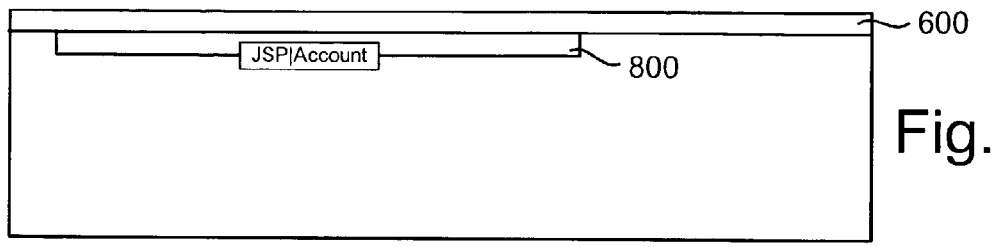
FIGS. 13A-E depict a portion of the graphical user interface.
Figure 13B:
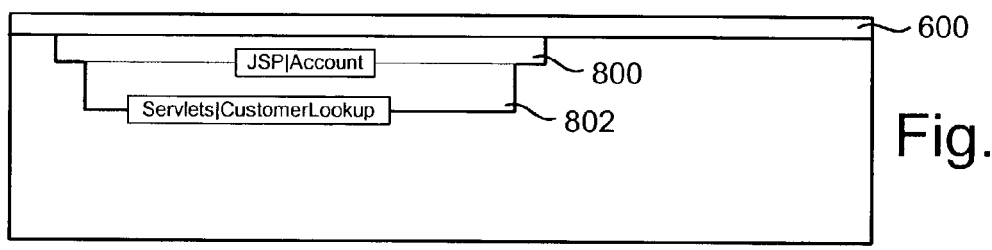
Figure 13C:
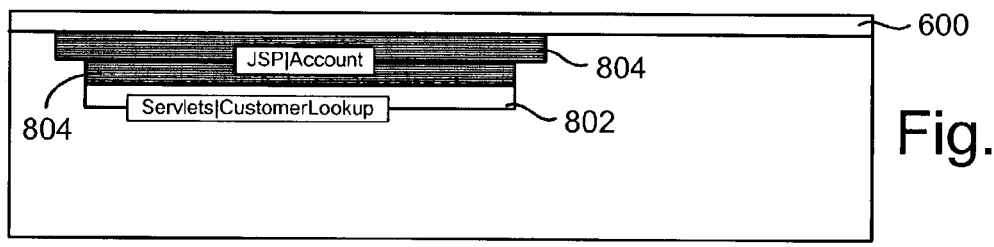
Figure 13D:
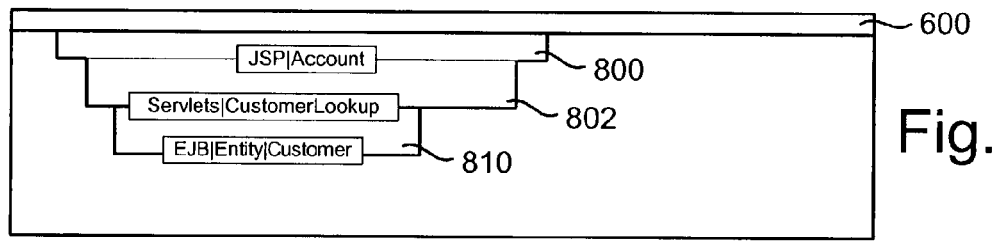
Figure 13E:
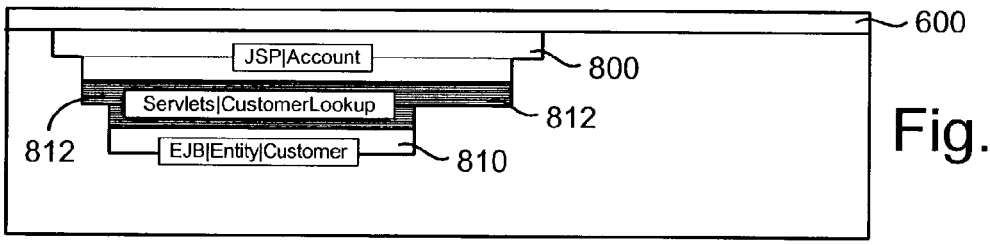

FIG. 14 is a flowchart describing one embodiment of a process for reporting detailed information about a component of the transaction. That is, when the user selects one of the components in transaction snapshot 502, detailed information is provided for that component in component information region 508, analysis region 510 and properties region 512. For example, if a user double-clicks on view 804 (see FIG. 13-C), then detailed information will be provided for root component JSP|Account. In step 830, the GUI receives the user's selection of a component. In step 832, the stored data for the chosen component is accessed. In step 834, the appropriate information is added to component information region 508. That is, the stored data is accessed and information indicating the type of component, the name of the component, and the path to the component are accessed and reported. Each of these data values are depicted in component information region 508. In step 836, data is added to the analysis region 510. That is, system accesses the stored duration (or calculates the duration), the timestamp, the start of the component relative to the start of the root component, and determines the percentage of transaction time used by that component. These values are displayed in the analysis region 510. The percentage of transaction times is calculated by dividing the duration of the selected component by the duration of the root component and multiplying by 100%. In step 838, data is added to the properties region. In one embodiment, the properties region will display the method invoked for the component. In other embodiments, other additional parameters can also be displayed. In one embodiment, regions 508, 510, and 512 are configurable to the display whatever the user configures it to display.

The user interface of FIG. 8 also includes a set of drop down menus. One of these menus can be used to allow the user to request a text file to be created. In response to the request by the user, the system will write all (or a configurable subset) of the information that is and/or can be displayed by the graphical user interface into a text file. For example, a text file can include the category, component name, timestamp, duration, percentage of the transaction time, URL, userID, host, process, Agent, all of the called subcomponents and similar data for the called subcomponents. Any and all of the data described above can be added to the text file.

The above discussion contemplates that the filter used by the Agent to determine whether to report a transaction is based on execution time. In other embodiments, other tests can be used. Examples of other tests include choosing based on UserID, provide a random sample, report any transaction whose execution time varies by a standard deviation, etc.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for providing transaction information, comprising:
   identifying one or more monitored transactions within an application that do not comply with a transaction threshold, the transactions monitored from within the application;
   displaying a table of transaction information for the one or more transactions that do not comply with the transaction threshold, the table displayed in an interface window and including transaction identification information and transaction timing information for each of the identified transactions, said step of displaying performed after said step of identifying;
   receiving a selection of an identified transaction displayed in the table; and
   providing graphical information associated with application components involved in the selected transaction in response to said step of receiving a selection, the graphical information indicating component identification and component timing information for the selected transaction, the graphical information including a graphical element for each component in the selected transaction, said graphical elements are positioned adjacent to each other if they represent application components that communicate with each other during the transaction, the graphical elements displayed along a time axis at a position corresponding to when they occurred with respect to each other, the graphical information displayed outside the table and concurrently in said interface window with the table;
   receiving a selection of a portion of the graphical information associated with an application component; and
   displaying type, location, and additional timing information in said interface window for the application component associated with the selection in response to said step of receiving a selection of a portion of the graphical information.

2. A method according to claim 1, wherein said graphical information includes a first axis being a time axis and a second axis indicating call level, further comprising:
   providing the user with the ability to adjust a zoom level of said time axis in real time.

3. A method for providing information, comprising:
   accessing data about a set of code, said set of code includes one or more components and corresponds to a transaction, said data received from a agent installed in an application which contains the set of code;
   displaying a graphical representation for each of said components in an interface window, said graphical representation includes a first axis being a time axis and a second axis indicating call level;
   displaying data for a plurality of transactions in a plurality of data cells in said interface window, the plurality of transactions including the transaction that the one or more components correspond to, the plurality of data cells displayed concurrently with the graphical representations, the data for the plurality of transactions including agent identification information for each transaction, the one or more graphical representations displayed outside of the plurality of data cells;
   said step of displaying a graphical representation includes displaying a shape for each component, said shape includes a portion for said respective component and a portion for a calling component;
   said portion for said respective component is highlighted when reporting about said respective component; and
   said portion for said calling component is highlighted when reporting about said calling component.

4. A method according to claim 3, wherein:
   said shape for each component is comprised of a first rectangular portion and a second rectangular portion, the first and second rectangular portions being adjacent along a length of each rectangular portion and having different lengths, the adjacent rectangular portions forming an non-rectangular shape representing one of the one or more components, the first rectangular portion representing a calling component and the second rectangular portion representing a called component.

5. A method according to claim 3, wherein:
   said set of code includes a plurality of methods;
   each of said components is one of said methods;
   said plurality of methods includes a root method;
   said plurality of methods includes a first method called by said root method and a second method called by said root method;
   said plurality of methods includes a third method called by said first method;
   said graphical representation includes three levels of views along said second axis, said three levels of views includes a first level, a second level and a third level;
   said first level includes a view for said root method;
   said second level includes a view for said first method under said view for said root method to indicate that said root method calls said first method;
   said second level includes a view for said second method under said view for said root method to indicate that said root method calls said second method; and
   said third level includes a view for said third method under said view for said first method to indicate that said first method calls said third method.

6. A method according to claim 3, further comprising:
   receiving a selection of said first method;
   accessing data about said first method; and
   displaying additional details about said first method.

7. A method according to claim 3, further comprising:
   receiving a mouse over event for a first component;
   accessing data about said first component; and
   displaying additional details about said first component.

8. A method according to claim 3, wherein said step of displaying includes:
   accessing a first data for a first set of code comprising a first component;
   displaying a first shape for the first component derived from the first data;
   accessing a second data for a second set of code comprising a second component;
   displaying a second shape adjacent to the first shape in response to accessing the second data; and
   displaying a third shape for the second component derived from the second data, the second shape and third shape displayed adjacent to each other, the first shape and the third shape having different dimensions.

9. A method according to claim 3, wherein said first axis is horizontal and said second axis is vertical, said step of displaying includes:
accessing a first data for a first set of code comprising a first component;
displaying a first shape for the first component derived from the first data;
accessing a second data for a second set of code comprising a second component;
displaying a second shape adjacent to the first shape in response to accessing the second data; and
displaying a third shape for the second component derived from the second data, the second shape and third shape displayed adjacent to each other, the first shape and the third shape having different dimensions.

10. A method according to claim 3, further comprising: providing an ability to adjust a granularity of said time axis in real time.

11. A method according to claim 3, wherein: said set of code is Java code and is part of an application.

12. A method for providing information, comprising:
providing a table of transaction data in an interface window, the transaction data retrieved for and representing one or more identified transactions and including information regarding a monitoring process used to monitor each transaction and generate at least a portion of the transaction data, each of the identified transactions occurring in an application and not complying with a transaction performance threshold, the application containing one or more sets of code that implements each monitoring process;
receiving a first input through the interface selecting an identified transaction listed in the table;
providing graphical component information in the interface window in response to said step of receiving a first input, the graphical component information representing one or more application components involved in the selected transaction, the graphical component information displayed concurrently with the table of transaction data in the interface window;
receiving a second input through the interface selecting a portion of the graphical representation associated with one of the one or more application components;
and providing application component runtime data in the interface window in response to said step of receiving a second input, the application component runtime data displayed concurrently with the graphical component information and the table of transaction data, said graphical component information and application component runtime data not provided within a table.

13. A method according to claim 12, wherein:
graphical component information indicates execution time and one or more invoking relationships;
said graphical representation includes a time axis and a call level axis;
said time axis is horizontal; and
said call level axis is vertical.

14. A method according to claim 13, further comprising: providing an ability to adjust a granularity of said time axis in real time.

15. A method according to claim 12, wherein:
said application component runtime data includes a percentage of execution time for said portion of said first set of code in comparison to execution time for said first set of code.

16. A method according to claim 12, wherein:
said application component runtime data includes an identification of a type of component for said portion of said first set of code.

17. One or more processor readable storage devices having processor readable code embodied on said processor readable storage devices, said processor readable code for programming one or more processors to perform a method comprising: identifying a plurality of transactions performed by an application that do not comply with a transaction threshold, each transaction including two or more components;
providing an interface window comprising a table and a graphical portion concurrently, the graphical portion not provided within a table;
providing a set of transaction information for each identified transaction in the table, the transaction information provided concurrently in the table for each of the identified transactions and including identification information, time information and monitoring code information for one or more monitors within the application for each transaction;
receiving a first selection of one set of transaction information provided in the table;
providing component information for one or more of the two or more components associated with the identified transaction which is associated with the selected set of transaction information, the component information provided in response to receiving the first selection of the set of transaction information, the component information provided graphically as a compilation of shapes in the graphical portion of the interface and including time information and identification information for each component involved in the identified transaction, the compilation of shapes including a shape for each of the one or more components, the component information provided concurrently with the set of transaction information;
receiving a second selection of one of the one or more components;
and providing component details associated with the performance of one of the one or more components, the component details provided within the interface window and not contained in the graphical portion, the component details including component path information, the duration of component running time, the component duration as a percentage of the total transaction time, and component type.

18. One or more processor readable storage devices according to claim 17, wherein:
receiving a second selection of a component through the graphical portion of the interface, the selected component included in the one or more components associated with the identified transaction.

19. One or more processor readable storage devices according to claim 17, wherein:
said graphical portion of said first set of code indicates execution time and one or more invoking relationships;
said graphical portion includes a time axis and a call level axis;
said time axis is horizontal; and
said call level axis is vertical.

20. One or more processor readable storage devices according to claim 19, wherein said method further comprises:
providing an ability to adjust a granularity of said time axis in real time.

21. One or more processor readable storage devices according to claim 17, wherein:
said first set of code is Java code.

22. One or more processor readable storage devices according to claim 17, wherein said method further comprises:
receiving a selection of a first portion of said first set of code;
accessing data about said first portion; and
displaying additional details about said first portion.

23. One or more processor readable storage devices according to claim 17, wherein:
one or more portions of said first set of code are Java methods;
said first set of code includes a root portion;
all of said one or more portions have a call history tracing back to said root portion; and
said first set of code is a transaction.

24. The method of claim 1, wherein the transaction information displayed in the table includes monitoring code data associated with monitoring code used to monitor each identified transaction.

25. The method of claim 24, wherein the monitoring code is an agent inserted into an application.

26. The method of 24, wherein the monitoring code data includes monitoring code identification and monitoring code location.

27. The method of 1, further comprising:
providing text information integrated within the graphical information for each application component associated with a selected transaction, the text information including application component name data and application component type data.

28. The method of claim 27, wherein application component type is one of a JSP, servlet, EJB and JDBC component.

29. The method of claim 12, wherein the table includes one or more rows, each row corresponding to transaction data associated with one of the one or more identified transaction, said first input selecting one of the one or more rows.

30. The method of claim 12, wherein the transaction performance threshold is a maximum transaction response time.

31. The method of claim 12, wherein the component runtime data includes data provided in a designated component information window within the interface, further comprising:
receiving a mouse over input for a component; and
providing a component pop-up window located at the selected component in response to receiving the mouse-over input, the component pop-up window containing additional component information.

32. The method of claim 31, wherein the additional component information in the component pop-up window includes component path data and percentage of total transaction time data associated with the component.

33. The one or more processor readable storage devices of claim 17, further comprising:
receiving a mouse over input for a component; and
providing a component pop-up window located at the selected component in response to receiving the mouse-over input, the component pop-up window containing additional component information.

34. A method for providing transaction information, comprising:
accessing data about a set of code, said data generated from monitoring a server that contains the set of code from within the server, said set of code corresponds to one or more monitored transactions and includes one or more components for each monitored transaction;
identifying one or more monitored transactions within an application that do not comply with a transaction threshold;
displaying a table of transaction information in an interface window for the one or more transactions that do not comply with the transaction threshold, the table including transaction identification information and transaction timing information for each of the identified transactions, said step of displaying performed after said step of identifying;
receiving a selection of an identified transaction displayed in the table;
and providing graphical information associated with application components involved in the selected transaction in response to said step of receiving a selection, the graphical information displayed outside of the table and indicating component identification and component timing information for the selected transaction, the graphical information including a graphical element for each component in the selected transaction, said graphical elements are positioned adjacent to each other if they represent application components that communicate with each other during the transaction, the graphical elements displayed along a time axis at a position corresponding to when they occurred with respect to each other, the graphical information displayed outside the table and concurrently with the table in the same interface window, said step of displaying a graphical representation includes displaying a shape for each component, said shape includes a portion for said respective component and a portion for a calling component, said portion for said respective component is highlighted when reporting about said respective component, and said portion for said calling component is highlighted when reporting about said calling component.

35. The method of claim 34, further comprising:
receiving a selection of a portion of the graphical information representing a component;
displaying component location information in response to the said step of receiving the selection; and
displaying a percentage of the total transaction time attributed to the selected component in response to the said step of receiving the selection.

36. The method of claim 35, wherein the selection is received as a mouse over input, the said step of displaying includes displaying the component location information and percentage of the total transaction time at least partially over the graphical information associated with the selected component.

37. The method of claim 34, wherein the transaction information includes agent identification information which identifies a second set of code used to monitor at least one of said one or more monitored transactions.

38. The method of claim 34, wherein the transaction information includes URL information associated with at least one of said one or more transactions.

* * * * *